United States Patent
Vlaming et al.

[11] Patent Number: 5,985,230
[45] Date of Patent: Nov. 16, 1999

[54] NITRIC ACID PRODUCTION

[75] Inventors: Rolf Vlaming; Jacques Koenig, both of Versailles; Philippe Arpentinier, Le Perray en Yvelines, all of France

[73] Assignee: L'Air Liquide, Société Anonyme pour l'Etude et l'Exploitation des Procédés Georges Claude

[21] Appl. No.: 08/726,405

[22] Filed: Oct. 3, 1996

[51] Int. Cl.[6] .................................................. C01B 21/38
[52] U.S. Cl. ........................................... 423/392; 423/393
[58] Field of Search ..................................... 423/392, 393

[56] References Cited

U.S. PATENT DOCUMENTS

| | | | |
|---|---|---|---|
| 4,062,928 | 12/1977 | Applegate et al. | 423/392 |
| 4,183,906 | 1/1980 | Watson et al. | 423/392 |
| 5,266,291 | 11/1993 | Drnevich et al. | 423/392 |

FOREIGN PATENT DOCUMENTS

| | | | |
|---|---|---|---|
| 803211 | 10/1958 | United Kingdom | 423/392 |

*Primary Examiner*—Wayne Langel
*Attorney, Agent, or Firm*—Burns, Doane, Swecker & Mathis, L.L.P.

[57] ABSTRACT

Provided is a process having an increased production capacity for nitric acid, which moves can be operated safely and efficiently. The process comprises forming a reaction mixtures by mixing air, ammonia, oxygen and an inert cooling fluid, preferably water, and then reacting the ammonia with oxygen in a reaction zone to form nitric oxide. The amount of inert cooling fluid in the reaction mixture is sufficient to control the temperature of the mixture and maintain the ammonia percentage below the lower explosion limit for the mixture. The nitric oxide produced in the reaction zone is then oxidized to nitrogen dioxide and its dimer, with additional oxygen being introduced into the process for oxidizing the nitric oxide. The nitrogen dioxide and its dimer is then reacted with water to form the nitric acid. The dual injection of oxygen into the ammonia reaction mixture and into the nitric oxide oxidizing step, together with the use of the inert cooling fluid in the ammonia reaction mixture, has been found to provide increased nitric acid production while allowing one to respect the constraints of good product bleaching, avoid catalyst loss due to volatilization, and operate under conditions below the lower explosion limit of the ammonia mixture.

13 Claims, 1 Drawing Sheet

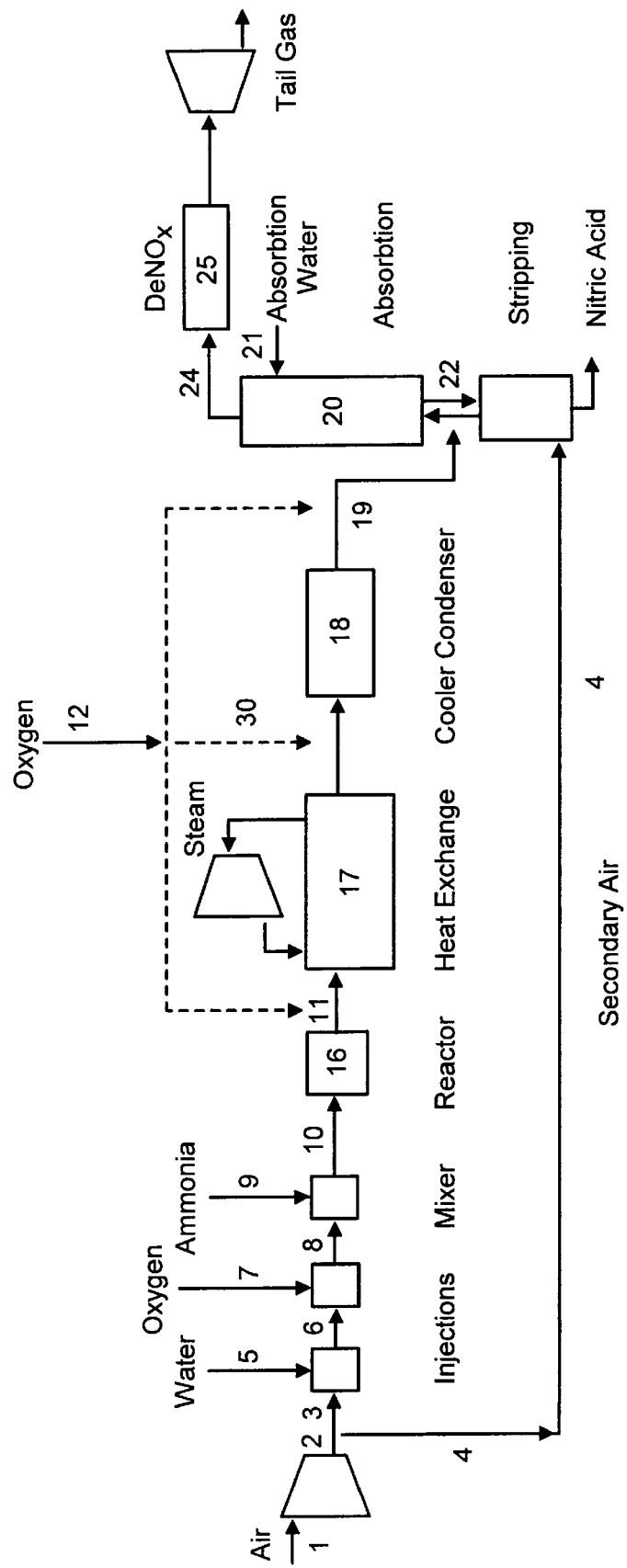
FIGURE

NITRIC ACID PRODUCTION

BACKGROUND OF THE INVENTION

The present invention relates to a process for producing nitric acid. More particularly, the present invention relates to a process for producing nitric oxide involving the supplemental injection of water and oxygen to provide a process exhibiting increased nitric acid production while permitting safe and efficient operation.

Nitric acid is generally manufactured on a commercial level by using a catalytic ammonia oxidation process. The process involves reacting ammonia and oxygen (generally obtained from air) over a catalyst, generally a platinum based gauze, in a reactor to selectively obtain nitric oxide and water:

$$4NH_3 + 5O_2 \rightarrow 4NO + 6H_2O$$

Generally, an excess amount of air relative to the stoichiometric amount is provided in order to control the flammability of the reaction mixture, the reactor outlet temperature and to provide extra oxygen for subsequent oxidation reactions.

The effluent gases from the reactor are then cooled in a series of heat exchangers to oxidize nitric oxide with oxygen to nitrogen dioxide and its dimer:

$$2NO + O_2 = 2NO_2 = N_2O_4$$

The nitrogen dioxide and its dimer are then reacted with water in an absorption column to produce nitric acid.

$$3NO_2 (or\ 3/2\ N_2O_4) + H_2O \rightarrow 2HNO_3 + NO$$

The resulting NO is oxidized again in the absorption column.

Several flow schemes exist for the catalytic ammonia oxidation process, but the following three zones are characteristic of all the processes. The three zones include a chemical combustion reactor, a chain of heat exchangers between the reactor and the absorption column, and the absorption tower.

The industry is constantly attempting to improve the production of nitric acid. Increased capacity, improvements in the product acid strength, as well as reduction of $NO_x$ effluent are all important objectives to rendering commercial processes more viable and acceptable. Steps have been taken in the prior art to primarily improve capacity.

For example, in U.S. Pat. Nos. 4,183,906 and 4,235,858, air enriched with oxygen is injected into the absorption tower. This injection of the enriched air allows excess air to be diverted to the front end reactor of the process to thereby increase capacity. It is also known, such as in U.S. Pat. Nos. 5,266,291 and 5,360,603, to inject air enriched with oxygen in the stream paths to the reactor. The available excess oxygen allows an increase in ammonia feed, thereby increasing the existing capacity. Generally, in such systems, the temperature of the system and flammability is controlled by water, carbon dioxide, nitrogen dioxide or nitrogen oxide injection into the front end of the reactor and/or into a specialized device of packed bed reactors. Such injection of enriched air to the reactor, however, creates a higher oxygen partial pressure, thereby resulting in an increase in the loss of catalyst by oxidation.

Increasing the production of nitric acid, particularly in existing facilities, is also an important objective. Such increased production, however, must be accomplished safely and efficiently.

The production increase of an existing nitric acid production facility, called debottlenecking, generally imposes the necessity of increasing the ammonia flow rate. At the same time less primary air is available, while more secondary air has to be sent to the stripping column to ensure good bleaching of the increased nitric acid produced. These two modifications in flow rates cause the reactor feed composition to change and the following two difficulties are introduced.

First, the ammonia percentage in the reactor feed, defined as $$\% NH_3 = \frac{NH_3}{(N_2 + O_2 + H_2O)_{air} + NH_3} 100\%$$

increases, which directs the operating conditions of the reactor towards the flammability zone, approaching the lower explosion limit (LEL) of ammonia in air.

Second, the reactor's outlet temperature rises, while less heat sink (e.g. inerts such as nitrogen, excess oxygen, and water) is present in the reactor feed per mole of ammonia. The reactor outlet temperature should not rise, as the catalytic gauze must be operated at the optimum gauze temperature.

In increasing the production of nitric acid in an existing facility, therefore, the problem is to increase the nitric acid production rate, while respecting the constraints of good product bleaching, safely operating out of the flammability zone and avoiding any increase in the reactor's outlet temperature. Efficient process operation to avoid catalyst loss due to volatilization is also an important consideration.

It is therefore an object of the present invention to provide an improved process for the production of nitric acid which enjoys increased nitric acid production capacity.

It is another object of the present invention to provide such an improved process which also avoids the problems of flammability and catalyst loss.

Yet another object of the present invention is to provide an improved process for the production of nitric acid which also respects the constraints of good product bleaching and avoids any increase in the reactors outlet temperature.

Yet another object of the present invention is to provide a novel nitric acid production process which can achieve the foregoing objectives using conventional equipment.

These and other objects of the present invention will become apparent upon a review of the following specification, the FIGURE of the drawing and the claims appended hereto.

SUMMARY OF THE INVENTION

The present invention provides a process for manufacturing nitric acid comprised of the steps of reacting ammonia with oxygen in a reactor. This reaction produces nitric oxide, which is then oxidized. The oxidized product is then reacted with water in an absorption column to produce nitric acid. The process of the present invention further involves, however, the injection of oxygen and an inert cooling fluid, preferably water, into the ammonia reaction mixture, as well as an additional injection of oxygen downstream of the reactor to oxidize the nitric oxide. The oxygen which is injected downstream of the reactor can be injected at any location which is upstream of the absorption column.

Among other factors, the present invention is based upon the discovery that when oxygen is dually injected into the reaction mixture as well as downstream of the reactor, concurrently with the injection of an inert cooling fluid such as water into the reaction mixture, the nitric acid production capacity is increased while respecting the constraints of good product bleaching, safe operation out of the flammability zone of the reaction mixture, and avoiding problems with loss of catalyst. The process of the present invention permits one to control the operating conditions so that they are below the lower explosive limits of the ammonia in air reaction mixture while also controlling the partial pressure of oxygen in the reaction mixture to avoid volatilization of the catalyst, which is typically platinum. As a result, one can enjoy improved production capacity of nitric acid while also operating a safe and efficient process.

BRIEF DESCRIPTION OF THE DRAWING

The FIGURE of the drawing schematically depicts a system for practicing the process of the present invention.

DETAILED DESCRIPTION OF THE PREFERRED EMBODIMENTS

The nitric acid production process of the present invention contains the three conventional zones of reacting ammonia with oxygen to form nitric oxide, oxidizing the nitric oxide to nitrogen dioxide in a heat exchanging zone, and then reacting the nitrogen dioxide with water in an absorption column to form the nitric acid product. The process of the present invention further comprises, however, the injection of oxygen and an inert cooling fluid, preferably water, into the ammonia reaction mixture, as well as an additional injection of oxygen downstream of the reactor to oxidize the nitric oxide.

The process of the present invention therefore involves forming a reaction mixture of air, ammonia, oxygen and an inert cooling fluid and reacting the ammonia with oxygen in a reaction zone to form nitric oxide. The oxygen which is introduced into the reaction mixture is generally pure oxygen or an oxygen enriched gas, i.e., generally air containing at least 25% oxygen content. Also, introduced into the reaction mixture, in an amount, or at a rate, sufficient to control the temperature of the mixture and maintain the ammonia percentage below the lower explosion limit (LEL) for the mixture, is an inert cooling fluid. The inert cooling fluid also performs a heat sink function.

The lower explosion limit of an ammonia and air mixture is not a constant, but a function of temperature, pressure, water content and the gas mixture's velocity. The influence of these parameters has been studied experimentally and theoretically. The lower explosion limit is found to decrease with increasing mixture temperature, and conversely. The influence of the temperature on the lower explosion limit can be calculated with the help of the following mathematical expression:

$$LEL(\% NH_3) = 16.2 \cdot (1 - 5.48 \ 10^{-4} \cdot T)$$

In the foregoing expression, T is the reaction mixture temperature in degree C. At ambient temperature the lower explosion limit for an ammonia and air mixture is generally about 16%, which is at static conditions. The temperature of the industrial ammonia-air mixture is generally about 130–200° C., resulting in an LEL of respectively 15.0%–14.4% ammonia in the reaction mixture at static conditions. It should be noted that considerations under static conditions is a conservative approach as the gas velocity results in the LEL increasing. As the gas velocity increases, the LEL increases.

According to the stoichiometry of the reaction of ammonia with oxygen, an ammonia-air reaction mixture should preferably contain about 14.3 volume percent ammonia, but this percentage is close to the lower explosion limit. Accordingly, commercial plants generally operate in the range of about 10–12 volume percent ammonia in the reaction mixture. In the process of the present invention, the inert cooling fluid is introduced into the reaction mixture in order to lower the temperature of the reaction mixture and maintain the temperature below the lower explosion limit.

The inert cooling fluid can be any fluid which is inert to the ammonia reaction with oxygen. Such fluids can be compressed, liquid NO, $NO_2$ or $CO_2$, but is most preferably water. The use of liquid water is most preferred because the water cools the reaction mixture through the utilization of heat of evaporation, and is also a medium which can be easily condensed subsequently in a cooler/condenser. As a result, the vapor load in the absorption column would be relatively less, allowing for more efficient operation of the absorption column, in which the reaction of nitrogen dioxide and its dimer to nitric acid takes place. The water also functions as a heat sink to absorb reaction heat.

The water introduced into the reaction mixture can be in the form of liquid water or steam. It is preferred that the water is introduced in the liquid form, in the temperature range of from about 30–200° C. The liquid water can be introduced into the compressed primary air of the reaction mixture at a temperature of about 150° C.–200° C. when the water is compressed under a pressure of about 5 bar. Most preferably, the temperature of the water introduced into the reaction mixture is in the range of from about 95–115° C.

It is also most preferred that the water be introduced as water droplets. The liquid water can be atomized by injecting the water into a small orifice under pressure.

Once the reaction mixture of air, ammonia, oxygen and the inert cooling fluid is formed, the ammonia is reacted with oxygen in a reaction zone. The reaction zone can be the mixing zone in which the reaction mixture is formed. However, it is preferred that the various components of the reaction mixture be mixed prior to entry into a reactor which acts as the reaction zone. It is most preferred that the air be first mixed with the water and oxygen, with the ammonia being the last component added to the reaction mixture. This will ensure that the concentration of ammonia in air be as low as possible. Generally, the amount of ammonia in the reaction mixture can range from about 5–30 mole percent, more preferably from 8–20 mole percent, and most preferably from 10–12 mole percent.

The reaction of ammonia with oxygen is generally conducted over a catalyst. The catalyst can be any suitable catalyst for the reaction, but is generally a platinum based catalyst, often referred to as a catalyst gauze due to the structure of the platinum and its carrier. Such catalysts are conventional in nitric acid production.

Another very important aspect of the present invention is the introduction of additional oxygen downstream of the reactor. This oxygen is introduced in order to provide oxygen for the oxidation of nitric oxide to nitrogen dioxide and its dimer. This reaction generally takes place in a heat exchange zone, and in the absorption column. The importance of this second introduction of oxygen into the reaction scheme permits one to control the oxygen partial pressure in the reaction mixture. To create too high a partial pressure of oxygen in the reaction mixture results in volatilization of the platinum catalyst as the platinum is oxidized to the metal oxide. Thus, by combining an injection of oxygen downstream from the reaction to provide the oxygen for the nitric oxide oxidation reaction with an injection of oxygen into the reaction mixture, the process of the present invention permits efficient operation and avoids the loss of catalyst which is prevalent in the prior art processes.

The oxygen which is introduced into the nitric oxide oxidation step is generally pure oxygen or an oxygen enriched gas, i.e., generally air containing at least 25% oxygen content. The choice of injection point will be dictated by flow characteristics and process specifications, but can be anywhere downstream of the reactor, but prior to the absorption column. The injection can be achieved through a multiple or single port injection. It is most preferred that pure oxygen is injected in accordance with the present process, as the use of atmospheric oxygen has two major disadvantages. The nitrogen that is introduced with the atmospheric oxygen generally gives rise to an extra increase in the volumetric flow. Furthermore, use of air prohibits oxygen from having its maximum impact on the partial pressure in the oxidation of nitric oxide. If the partial pressure of oxygen is greater, the rate of NO oxidation is faster.

The oxidized nitric oxide from the heat exchange zone is then passed into an absorption tower, where the nitrogen dioxide and its dimer are reacted with water to form the nitric acid. Bleaching and stripping of the nitric acid then occurs as is conventional in nitric acid production. Operation of the present invention permits one to observe the constraints of good product bleaching by permitting sufficient secondary air to be used in the nitric acid bleaching process. The process of the present invention also operates efficiently without the loss of catalyst as it respects the oxygen partial pressure that is normally run in commercial productions while still enjoying increased nitric acid production and running the catalyst at its optimum temperature.

In the Figure of the drawing, an example of a typical scheme for the practice of the present invention is provided. Air 1 is compressed 2 and then split into two streams 3 and 4. Stream 3 is the primary air used in the reaction mixture, while stream 4 is the secondary air passed on to the bleaching of the nitric acid product. The primary air is mixed with water 5 and oxygen 7 and finally ammonia 9. The reaction mixture is fully mixed in a static mixer 15. The mixed gas is then passed via 10 into the reactor 16 containing the platinum based catalyst gauze. In the reactor 16, the ammonia and oxygen react to form nitric oxide.

The nitric oxide effluent is then passed via 11 through a heat exchange zone 17. The heat exchange zone can comprise a series of heat exchangers, the last of which would be cooler/condenser 18. The nitric oxide is oxidized in the heat exchange zone by reaction of nitric oxide with oxygen. Additional oxygen is injected into the heat exchange zone at 12. This additional oxygen provides sufficient oxygen to oxidize the nitric oxide. The oxygen can be injected at any location in the heat exchange zone, generally downstream from the reactor but upstream of the absorption column. It is preferred that the oxygen be introduced into the nitric oxide oxidation process step at a location prior to the cooler condenser, as shown in the Figure of the drawing at 30.

The nitric oxide is oxidized to nitrogen dioxide and its dimer, with the effluent being passed via 19 from the last heat exchanger, the cooler/condenser, into the absorption tower 20. The effluent that is passed through the absorption tower comprises the oxidized nitric oxide (in gas phase) and a weak acid (liquid phase), which weak acid is made due to the presence of moisture in the reaction stream. In certain cases, the oxidized nitric oxide and weak acid are separated before being passed into the absorption tower. Such separation occurs when one wishes to introduce the liquid and gas phases at different trays of the tower. Separation, however, is not always necessary, and the entire effluent can be injected into the tower at the same level.

Water is introduced into the tower 20 via line 21 so that the nitrogen dioxide reacts with the water to form nitric acid. The nitric acid product is then removed via line 22. Bleach air (secondary air) can be introduced via line 4, with the nitric acid product being purified and recovered.

The tail gas effluent is taken off the top of the tower via line 24. This gas generally involves $NO_x$ gases. The tail gas effluent can be treated in 25 to remove the noxious $NO_x$ gases, as is conventional in nitric acid production.

The invention will be illustrated in greater detail by the following specific examples. It is understood that these examples are given by way of illustration and are not meant to limit the disclosure of the claims to follow. All percentages in the examples and elsewhere in the specification are by weight unless otherwise specified.

EXAMPLE 1

In the present simulation using the system depicted in the FIGURE of the Drawing, the injection of steam in the primary air adjusts the total inert flow rate to the reactor. 500 Kmole/hr superheated steam is injected at 6.0 bar absolute, a pressure slightly higher than the pressure of the primary air. The temperature of the steam is chosen arbitrarily to be 165° C. and thus lower than the temperature of the primary air of 199° C. The function of steam, therefore, will be primarily as a heat sink, while lowering the temperature only slightly. The total oxygen flow rate is adjusted by the injection of pure commercial oxygen, which is delivered industrially at ambient temperature. The result is that the reactor feed temperature becomes a function of the injection flow rates and will be lower than the original reactor feed temperature (control case 1 in Example 2).

Although the inlet temperature is reduced, the optimum reactor temperature is respected, which can be realized by increasing the ammonia percentage in the feed. Even if the reaction mixture had the original temperature, the reactor outlet temperature would be lower due to the superior heat capacity of water in comparison with the heat capacity of nitrogen.

In the example of case A, the steam and oxygen are injected in a molar nitrogen-oxygen ratio of air equal to 3.82. The results of the simulation are listed numerically in the Table below. Each of the numerical numbers in the headings of the Table correspond to the conduit depicted in the FIGURE of the Drawing.

| Case A | primary air 3 | steam 5 | $O_2$ 7 | $NH_3$ 9 | FEED 10 | Mole fraction 10 | Outlet 11 |
|---|---|---|---|---|---|---|---|
| $H_2O$ | 34.49 | 500.00 | 0.00 | 0.00 | 534.49 | 0.1295 | 1216.66 |
| NO | 0.00 | 0.00 | 0.00 | 0.00 | 0.00 | 0.0000 | 445.69 |
| $N_2$ | 2375.22 | 0.00 | 0.00 | 0.00 | 2375.22 | 0.5755 | 2379.76 |
| $O_2$ | 631.39 | 0.00 | 0.00 | 0.00 | 762.40 | 0.1847 | 198.47 |

-continued

| Case A | primary air 3 | steam 5 | $O_2$ 7 | $NH_3$ 9 | FEED 10 | Mole fraction 10 | Outlet 11 |
|---|---|---|---|---|---|---|---|
| $HNO_3$ | 0.00 | 0.00 | 0.00 | 0.00 | 0.00 | 0.0000 | 0.00 |
| $NH_3$ | 0.00 | 0.00 | 131.01 | 454.78 | 454.78 | 0.1102 | 0.00 |
| Total | 3041.10 | 500.00 | 131.01 | 454.78 | 4126.89 | 1.000 | 4240.58 |
| Temperature | 199.00 | 165.00 | 25.00 | 125.00 | 178.94 | 178.94 | 899.80 |
| Pressure | 5.93 | 6.00 | 6.00 | 6.00 | 5.93 | 5.93 | 5.83 |

A huge variety of other solutions can be formed in changing the steam-oxygen ratio, in which the reactor outlet temperature is maintained by modification of the ammonia percentage in the feed. But the injections of steam and oxygen are subjected to different constraints.

The amount of steam that can be injected is limited by the desired nitric acid strength to be produced. The net water formation represented by the overall reaction equation, $$NH_3 + 2O_2 \rightarrow HNO_3 + H_2O$$

together with the absorption water added at the top of the absorption tower and the steam injected in the reaction mixture will determine the final acid strength. The amount of water that is formed by the reaction cannot be influenced, so that the additional amount of water necessary to yield the final acid strength must be provided by the absorption water and the injected steam.

Depending on the geometry of the absorber column a minimum absorption water flow must be fed to the column to ensure its performance. The steam injection accounts for the remaining water quantity needed. The injection of steam might require that the weak acid, produced in the cooler condenser, must be fed to a plate higher in the column. The steam quantity injected in case A is believed to be the upper limit while only 278 Kmole/hr absorption water is added to the column and 500 Kmole/hr is injected in the reactor feed as steam. The absorption water flow in control case 1 of Example 2 is 643 Kmole/hr The oxygen injection is generally limited for economical reasons to the amount that is strictly necessary to transform the additional ammonia completely into nitric acid.

Finally, if the temperature of the reactor feed is decreased significantly by the injection of the steam and the oxygen, the ammonia percentage in the feed must be increased more. The increase in liberated reaction heat, due to this augmentation, compensates for the lower inlet temperature so that the reactor still operates at the optimum catalytic gauze temperature. If the temperature of the reactor feed increases, the inverse reasoning is valid and the ammonia percentage in the feed has to be reduced.

EXAMPLE 2

This example relates to a simulation using water droplets in the present invention. The total flow rate of inerts can as well be increased by the injection of very small water droplets that vaporize in the primary air. Such an injection has (as compared to steam or another vapor) the advantage that the increase of the available heat sink (inerts), is accompanied by a substantial lowering of the primary air temperature by the subtraction of the vaporization heat.

The water quantity that can be injected is thermodynamically limited by the saturation pressure of water in air at the resulting temperature. The maximum production is obtained when increasing the total feed maximally, with the ammonia percentage being fixed by the heat balance. This means that oxygen has to be injected in the reaction mixture respecting the oxygen-inert ratio of air or an increased oxygen-inert ratio. Depending on the operator's choice the maximum amount of oxygen that can be injected is fixed by a maximum oxygen partial pressure, relating to the catalyst volatilization. Other considerations include simple economical reasoning and using an amount strictly necessary to transform the ammonia completely into nitric acid.

Provided is a computer simulated comparison of runs involving the production of nitric acid pursuant to the reaction scheme shown in the FIGURE. Results are given for a reference, control situation and three separate cases in which the ammonia feed has been increased using water injection and oxygen enrichment. The compressed air temperature is constant while the operating of the compressor is not altered. The total primary air flow is in each case reduced as a function of the new realized acid production, shifting the air split ratio to ensure good bleaching of the nitric acid. The amount of water that is injected in the hot primary air corresponds to 95% of the amount that causes the partial water pressure in the air to reach the saturation pressure. This safety margin is taken to avoid possible local condensation of water. All flow rates are in Kmole/hr unless stated else. Pressures are expressed in bar, temperatures in ° C.

Below are the control case results, case 1:

| Case 1 (Kmole/hr) | primary air 3 | $H_2O$ 5 | $O_2$ 7 | $NH_3$ 9 | FEED 10 | Mole fraction 10 | Outlet 11 |
|---|---|---|---|---|---|---|---|
| $H_2O$ | 36.29 | 0.00 | 0.00 | 0.00 | 38.29 | 0.010 | 605.42 |
| NO | 0.00 | 0.00 | 0.00 | 0.00 | 0.00 | 0.000 | 371.83 |
| $N_2$ | 2499.33 | 0.00 | 0.00 | 0.00 | 2499.33 | 0.698 | 2503.12 |
| $O_2$ | 664.38 | 0.00 | 0.00 | 0.00 | 664.38 | 0.186 | 183.91 |
| $HNO_3$ | 0.00 | 0.00 | 0.00 | 0.00 | 0.00 | 0.00 | 0.00 |
| $NH_3$ | 0.00 | 0.00 | 0.00 | 379.42 | 379.42 | 0.106 | 0.00 |
| Total | 3200 | 0.00 | 0.00 | 379.42 | 3579.42 | 1.000 | 3674.27 |
| Temperature | 199.0 | | | 125.00 | 188.91 | | 900.91 |
| Pressure | 5.93 | | | 5.93 | 5.93 | | 5.83 |

Case 2 demonstrates that the injection of water together with oxygen allows one to increase the ammonia flow rate by 7.4%, without increasing its percentage in the reactor feed. Oxygen is injected until the partial pressure in the reactor feed equals that of the control case.

| Case 2 | primary air 3 | $H_2O$ 5 | $O_2$ 7 | $NH_3$ 9 | FEED 10 | Mole fraction 10 | Outlet 11 |
|---|---|---|---|---|---|---|---|
| $H_2O$ | 35.61 | 235.70 | 0.00 | 0.00 | 271.31 | 0.071 | 882.75 |
| NO | 0.00 | 0.00 | 0.00 | 0.00 | 0.00 | 0.000 | 399.47 |
| $N_2$ | 2452.87 | 0.00 | 0.00 | 0.00 | 2452.87 | 0.638 | 2456.95 |
| $O_2$ | 652.04 | 0.00 | 61.70 | 0.00 | 714.73 | 0.186 | 208.27 |
| $HNO_3$ | 0.00 | 0.00 | 0.00 | 0.00 | 0.00 | 0.00 | 0.00 |
| $NH_3$ | 0.00 | 0.00 | 0.00 | 407.63 | 407.63 | 0.106 | 0.00 |
| Total | 3140.52 | 235.70 | 61.70 | 407.63 | 3845.54 | 1.000 | 3947.45 |
| Temperature | 199.0 | 50.00 | 25.00 | 125.00 | 90.76 | | 809.53 |
| Pressure | 5.93 | 5.93 | 5.93 | 5.93 | 5.93 | | 5.83 |

The resulting reactor outlet temperature is below the optimum gauze temperature of the control case, although the composition of the feed in terms of oxygen, ammonia and inert is kept constant. The temperature increase over the reactor, on the other hand, is nearly that of the control case and the lower outlet temperature is due to the reduced reactor feed temperature.

The optimum reactor outlet temperature can be reached by allowing the ammonia percentage in the feed to increase to 12.15% as is demonstrated by the results of case 3 below.

This means an increase in the ammonia feed flow of 21.4%. Again oxygen is injected respecting the partial oxygen pressure of the control case. This amount of oxygen although does not correspond to the oxygen quantity that is necessary to oxidize the ammonia all along the process into the nitric acid, but is sub-stoichiometric. The complementary amount of oxygen, about 87.6 Kmole/hr, is to be injected in front of the cooler condenser (12) to ensure complete oxidation of nitric oxide to nitrogen dioxide and its dimer. The air split ratio is adjusted to ensure the bleaching.

| Case 3 | primary air 3 | $H_2O$ 5 | $O_2$ 7 | $NH_3$ 9 | FEED 10 | Mole fraction 10 | Outlet 11 |
|---|---|---|---|---|---|---|---|
| $H_2O$ | 34.34 | 227.38 | 0.00 | 0.00 | 261.73 | 0.069 | 952.75 |
| NO | 0.00 | 0.00 | 0.00 | 0.00 | 0.00 | 0.000 | 461.47 |
| $N_2$ | 2365.49 | 0.00 | 0.00 | 0.00 | 2365.49 | 0.624 | 2370.10 |
| $O_2$ | 628.81 | 0.00 | 74.920 | 0.00 | 703.73 | 0.186 | 132.48 |
| $HNO_3$ | 0.00 | 0.00 | 0.00 | 0.00 | 0.00 | 0.00 | 0.00 |
| $NH_3$ | 0.00 | 0.00 | 0.00 | 460.68 | 460.68 | 0.122 | 0.00 |
| Total | 3028.64 | 227.38 | 74.92 | 460.68 | 3791.63 | 1.000 | 3906.80 |
| Temperature | 199.0 | 50.00 | 25.00 | 125.00 | 91.23 | | 900.68 |
| Pressure | 5.93 | 5.93 | 5.93 | 5.93 | 5.93 | | 5.83 |

In case 4, the oxygen molar fraction of the feed is allowed to increase to 0.2. This means a relatively small increase in the oxygen partial pressure, which is not expected to increase significantly the vaporization of the catalytic platinum. The ammonia flow rate can be augmented with 23.35% in comparison with the control case, gaining about 2% absolute in comparison with the augmentation of case 3. The oxygen injection in the reaction mixture is still sub-stoichiometric and the complementary amount of oxygen is injected in the cooler condenser (about 32.4 kmole/hr).

| Case 4 | primary air 3 | $H_2O$ 5 | $O_2$ 7 | $NH_3$ 9 | FEED 10 | Mole fraction 10 | Outlet 11 |
|---|---|---|---|---|---|---|---|
| $H_2O$ | 34.17 | 226.22 | 0.00 | 0.00 | 260.39 | 0.088 | 962.46 |
| NO | 0.00 | 0.00 | 0.00 | 0.00 | 0.00 | 0.000 | 458.69 |
| $N_2$ | 2353.37 | 0.00 | 0.00 | 0.00 | 2353.37 | 0.611 | 2358.05 |
| $O_2$ | 625.58 | 0.00 | 144.87 | 0.00 | 770.45 | 0.200 | 190.07 |
| $HNO_3$ | 0.00 | 0.00 | 0.00 | 0.00 | 0.00 | 0.00 | 0.00 |

-continued

| Case 4 | primary air 3 | H$_2$O 5 | O$_2$ 7 | NH$_3$ 9 | FEED 10 | Mole fraction 10 | Outlet 11 |
|---|---|---|---|---|---|---|---|
| NH$_3$ | 0.00 | 0.00 | 0.00 | 468.05 | 468.05 | 0.121 | 0.00 |
| Total | 3013.12 | 226.22 | 144.87 | 468.05 | 3852.26 | 1.000 | 3969.27 |
| Temperature | 199.0 | 50.00 | 25.00 | 125.00 | 90.17 | | 899.43 |
| Pressure | 5.93 | 5.93 | 5.93 | 5.93 | 5.93 | | 5.83 |

While the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A process for producing nitric acid which comprises:
   (i) forming a reaction mixture of air, ammonia, oxygen and an inert cooling fluid which comprises water or CO$_2$, and reacting the ammonia with oxygen in a reaction zone to form nitric oxide, with the amount of inert cooling fluid being sufficient to control the temperature of the mixture and maintain the ammonia percentage in the mixture below the lower explosion limit of the mixture;
   (ii) oxidizing the nitric oxide to nitrogen dioxide and its dimer, and introducing additional oxygen into the process step of oxidizing the nitric oxide; and,
   (iii) reacting the nitrogen dioxide and its dimer with water to form nitric acid.

2. The process of claim 1, wherein the inert cooling fluid comprises water.

3. The process of claim 2, wherein the water introduced into the reaction mixture is in the form of water droplets.

4. The process of claim 2, wherein the water droplets are at a temperature of from about 30 to 200° C.

5. The process of claim 4, wherein the water droplets are at a temperature in the range of from about 95° C. to about 115° C.

6. The process of claim 2, wherein the water introduced into the reaction mixture is in the form of steam.

7. The process of claim 1, wherein the reaction zone comprises a catalyst for the reaction of ammonia with oxygen to form nitric oxide.

8. The process of claim 7, wherein the catalyst comprises a platinum catalyst.

9. The process of claim 1, wherein the oxygen introduced into the reaction mixture and/or the oxygen introduced into the process step of oxidizing the nitric oxide is introduced as oxygen enriched air.

10. The process of claim 1, wherein the oxygen introduced into the reaction mixture and/or into the process step of oxidizing the nitric oxide is substantially pure oxygen.

11. The process of claim 1, wherein the amount of ammonia present in the reaction zone of step (i) is in the range of from about 5 to 30 mole percent.

12. The process of claim 11, wherein the amount of ammonia present in the reaction zone of step (i) is in the range of from about 10–12 mole percent.

13. The process of claim 1, wherein the air and oxygen introduced into the reaction mixture are introduced as oxygen enriched air.

* * * * *